(12) United States Patent
Westlake et al.

(10) Patent No.: US 10,470,372 B2
(45) Date of Patent: Nov. 12, 2019

(54) FRAME SUSPENSION FOR ROTARY RAKES AND TEDDERS

(71) Applicant: Pequea Machine, Inc., New Holland, PA (US)

(72) Inventors: James Westlake, Manheim, PA (US); Isaac Glick, Quarryville, PA (US); Bryan Miller, Elizabethtown, PA (US)

(73) Assignee: Pequea Machine, Inc., New Holland, PA (US)

( * ) Notice: Subject to any disclaimer, the term of this patent is extended or adjusted under 35 U.S.C. 154(b) by 0 days.

(21) Appl. No.: 14/798,927

(22) Filed: Jul. 14, 2015

(65) Prior Publication Data

US 2017/0064907 A1 Mar. 9, 2017

Related U.S. Application Data

(60) Provisional application No. 62/024,551, filed on Jul. 15, 2014.

(51) Int. Cl.
*A01D 78/10* (2006.01)
*A01B 73/04* (2006.01)

(52) U.S. Cl.
CPC ........ *A01D 78/1014* (2013.01); *A01B 73/046* (2013.01); *A01D 78/1078* (2013.01)

(58) Field of Classification Search
CPC ....... A01B 73/02; A01B 73/04; A01B 73/044; A01B 73/046; A01B 73/048;
(Continued)

(56) References Cited

U.S. PATENT DOCUMENTS 3,120,092 A * 2/1964 van der Lely ........... A01C 3/08
56/400
3,785,133 A * 1/1974 van der Lely ..... A01D 78/1078
56/370
(Continued)

FOREIGN PATENT DOCUMENTS

DE 3716311 A1 * 12/1988 ........... B60G 11/225
DE 9205409 U1 * 6/1992 ........... A01B 73/046
(Continued)

*Primary Examiner* — Thomas B Will
*Assistant Examiner* — Joan D Misa
(74) *Attorney, Agent, or Firm* — Miller Law Group, PLLC

(57) ABSTRACT

A suspension mechanism for a rotary rake implement incorporates elastomeric shock absorbing members in the corners of a tubular member situated in between the corners of a square rod formed as part of the wheel assembly and received within the tubular member such that the corners of the square rod assert a pre-load spring force on the tubular member when the implement is in an extended operating configuration. The movement of the implement into a folded transport configuration with the weight of the implement supported on the transport wheel assemblies causes a deflection of the square rod that compresses the elastomeric shock absorbing members within the corners of the tubular member to provide maximum suspension for the implement when in transport, while providing minimum suspension when the implement is in operation. An end cap on the square rod engages a stop formed on the tubular member to control rotation.

6 Claims, 8 Drawing Sheets

(58) Field of Classification Search
CPC .............. A01D 78/1014; A01D 78/105; A01D 78/1007; A01D 78/1078
USPC ................. 56/380, 384, 392, 396, 377, 386; 280/124.169
See application file for complete search history.

(56) References Cited

U.S. PATENT DOCUMENTS

| | | | | |
|---|---|---|---|---|
| RE28,259 E | * | 12/1974 | Henschen | B60G 11/225 267/154 |
| 4,043,571 A | | 8/1977 | Guerbet | |
| 4,166,352 A | | 9/1979 | Knusting | |
| 4,178,998 A | * | 12/1979 | Rockwell | A01B 73/046 172/311 |
| 4,204,575 A | * | 5/1980 | Richardson | A01B 73/046 172/1 |
| 4,366,666 A | | 1/1983 | van der Lely | |
| 4,576,238 A | * | 3/1986 | Spencer | A01B 73/065 172/311 |
| 4,723,404 A | * | 2/1988 | Aron | A01D 78/1014 56/370 |
| 4,996,833 A | * | 3/1991 | Von Allowerden | A01B 73/042 56/367 |
| 5,111,636 A | * | 5/1992 | Quirin | A01B 73/042 56/367 |
| 5,784,873 A | * | 7/1998 | Aron | A01D 78/1014 56/367 |
| 6,109,012 A | * | 8/2000 | Staal | A01D 78/1014 172/311 |
| 6,561,283 B2 | * | 5/2003 | Hundeby | A01B 27/00 172/311 |
| 6,692,014 B1 | * | 2/2004 | Grosso | B60G 7/02 280/124.166 |
| 6,752,411 B2 | * | 6/2004 | Few | B60G 11/225 267/279 |
| 7,318,312 B2 | * | 1/2008 | Cicci | A01D 78/1014 56/377 |
| 7,789,408 B2 | * | 9/2010 | Sloan | B60G 3/145 280/124.129 |
| 7,832,745 B2 | * | 11/2010 | Rauch, Jr. | B60B 3/001 16/44 |
| 8,186,697 B2 | * | 5/2012 | Stephenson | B60G 3/145 280/124.129 |
| 8,210,550 B2 | * | 7/2012 | White | B62B 9/18 16/18 R |
| 8,226,101 B2 | * | 7/2012 | Lariviere | B60G 11/225 280/124.166 |
| 2010/0032924 A1 | * | 2/2010 | Menichetti | A01D 78/144 280/638 |

FOREIGN PATENT DOCUMENTS

| | | | | |
|---|---|---|---|---|
| DE | 29511268 U1 | * | 9/1995 | ........... A01D 78/105 |
| EP | 0701771 A1 | * | 3/1996 | ........... A01B 73/046 |
| EP | 0772962 A1 | * | 5/1997 | ......... A01D 78/1014 |
| GB | 1479304 A | * | 7/1977 | ......... A01D 78/1078 |

* cited by examiner

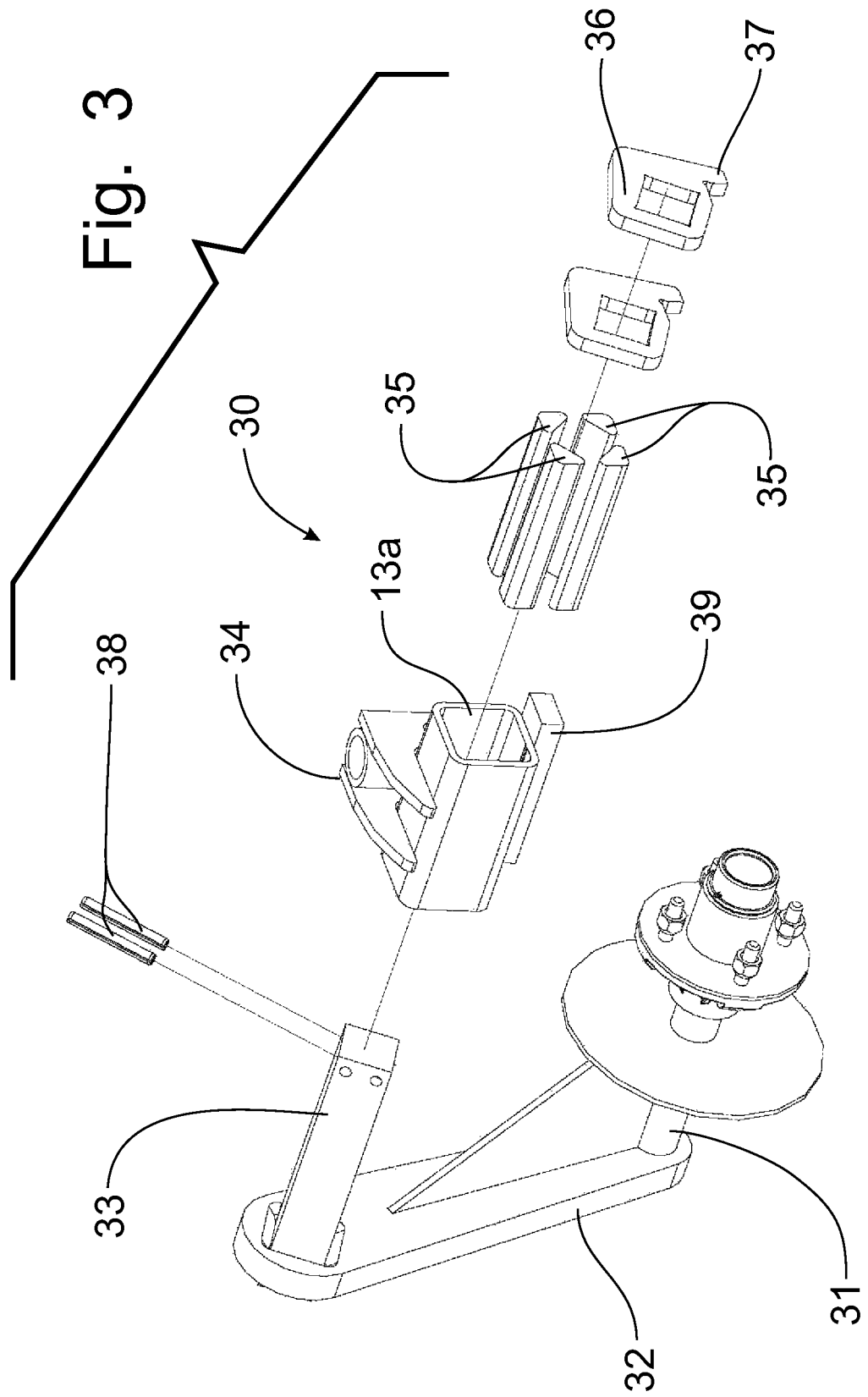

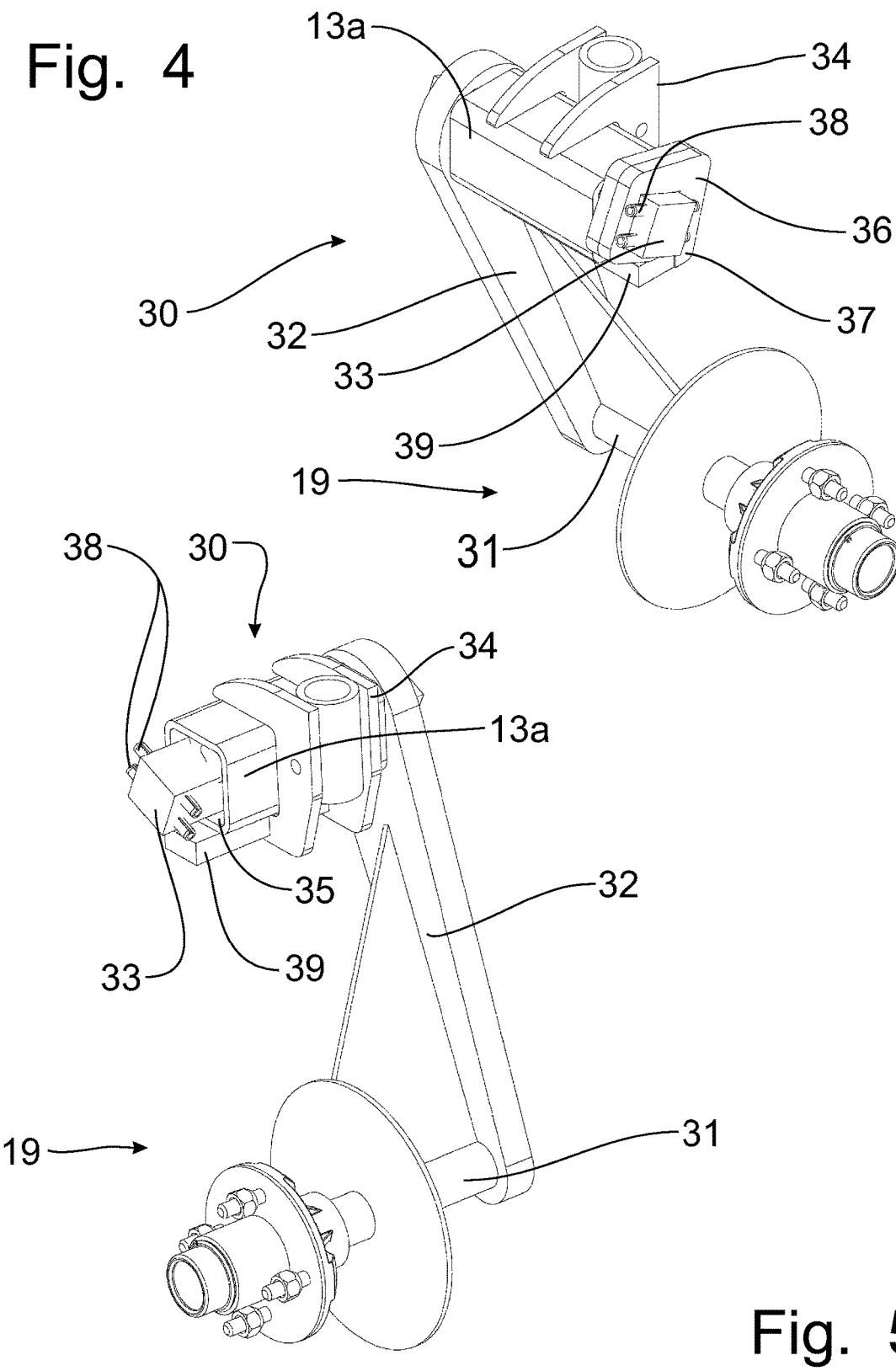

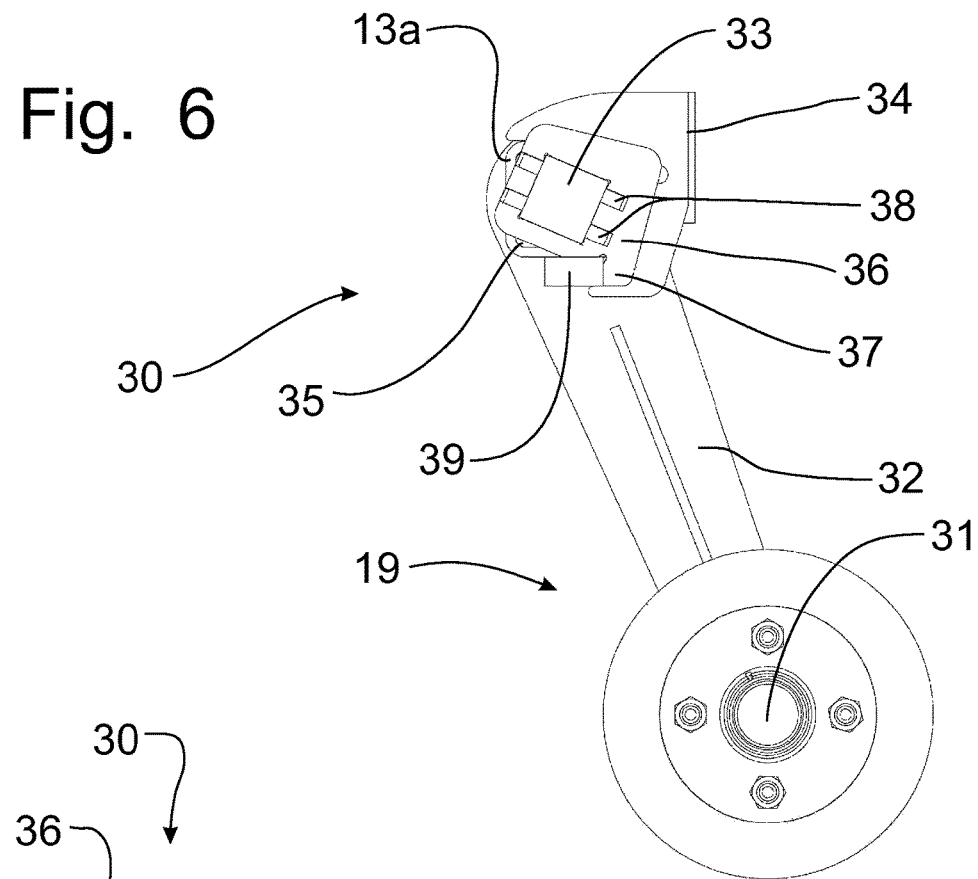

Fig. 8
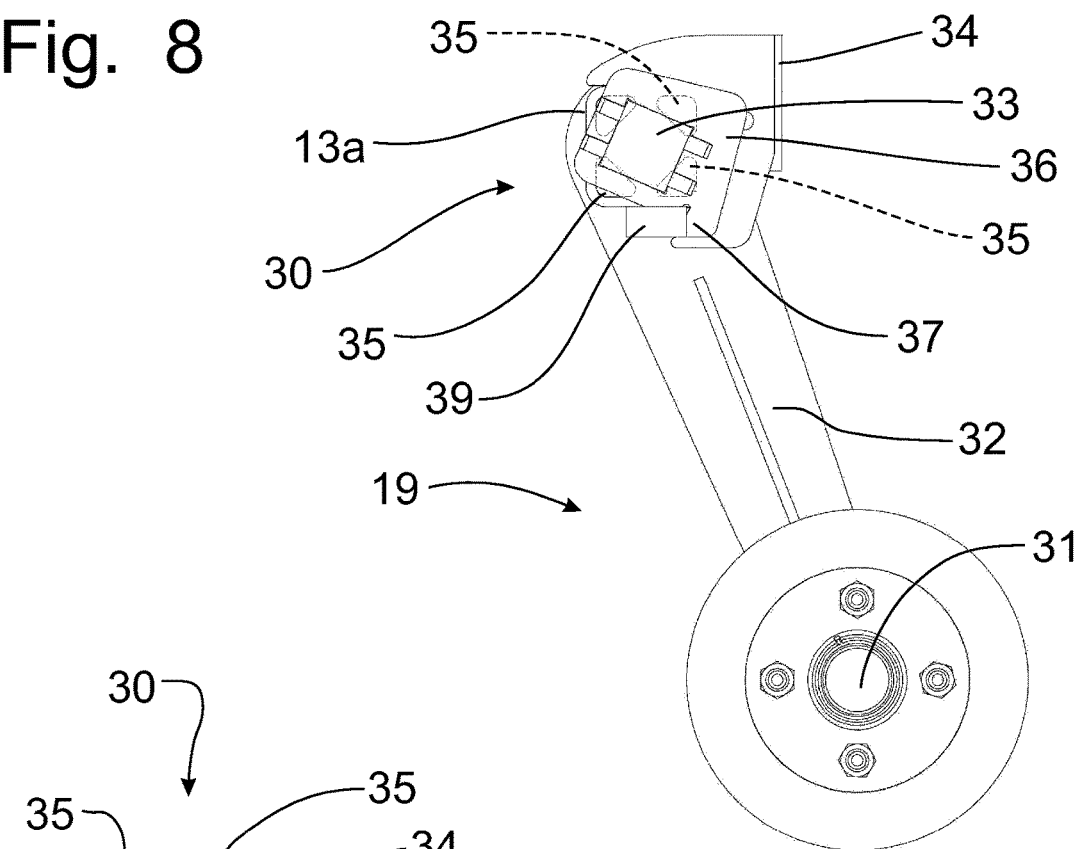
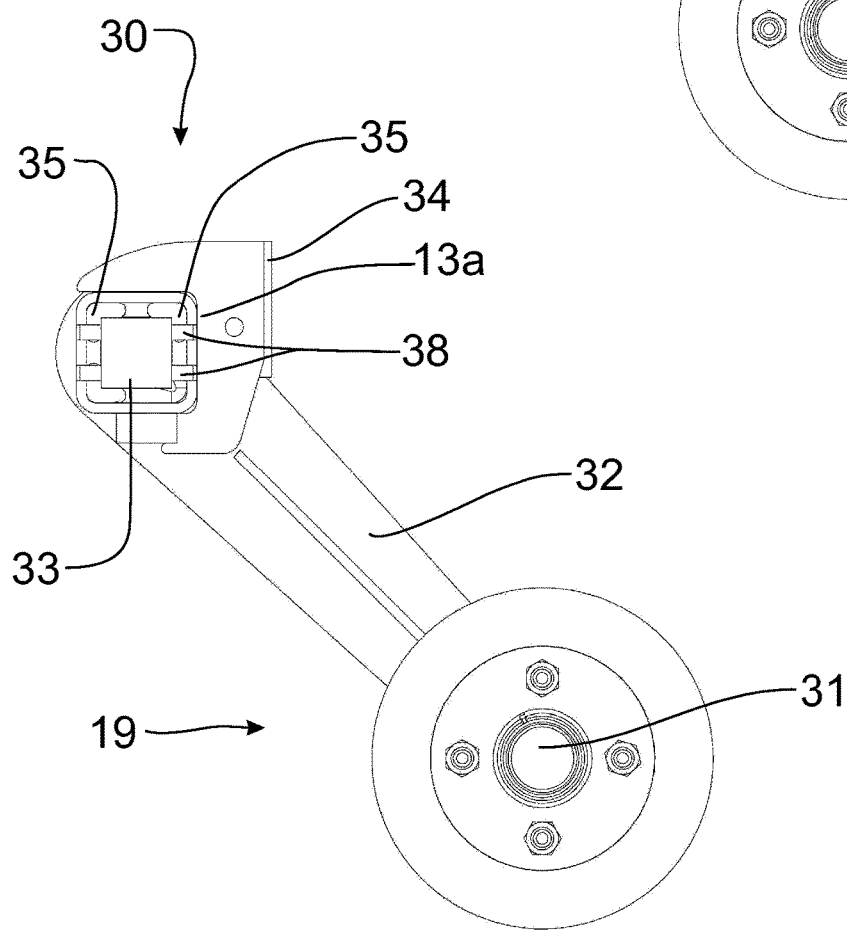
Fig. 9

FRAME SUSPENSION FOR ROTARY RAKES AND TEDDERS

CROSS-REFERENCE TO RELATED APPLICATIONS

This application claims domestic priority on U.S. Provisional Patent Application Ser. No. 62/024,551, filed on Jul. 15, 2014, the content of which is incorporated herein by reference.

FIELD OF THE INVENTION

The present invention relates generally to agricultural machines having rotational members for engaging crop on the ground, and, more particularly, to a suspension mechanism for rotary rakes and tedders that will allow minimal suspension during operation and maximum suspension when in transport.

BACKGROUND OF THE INVENTION

A tedder is an agricultural implement that has two or more, perhaps up to eight or ten, rotary members that have tines moving close to the surface of the ground as the tines are rotated in operation. The tines engage severed crop material lying on the ground and fluff the crop so that air can circulate through the crop more easily to cause the crop to dry. Tedders are typically used to fluff hay that had been cut previously and is lying flat on the ground. Once the cut hay crop is fluffed by the tedder, air can circulate better and allow the hay crop to be baled earlier. Rotary rakes are essentially the same type of equipment as tedders except that rotary rakes control the orientation of the tines in conjunction with the engagement of the crop to place the crop into a windrow for baling.

Tedders and rotary rakes are implements that can be mounted on the three-point hitch of a tractor to be operated through the field, or connected to the tractor hitch as a tow-behind implement, typically referred to as a pull-type implement, for movement across the field. In North America, the market for tedders and rotary rakes are primarily pull-type implements that are operably connected to the power take-off of the tractor to receive rotational power therefrom. The rotational power is delivered to a gearbox that distributes the rotational movement to the individual rake baskets for the rotation of the tines for engagement of the crop on the surface of the field.

Tedders and rotary rakes have a transversely extending operable configuration in which the individual rake baskets are placed in a generally linear manner transverse to opposing sides of the direction of travel of the implement and the prime mover to which the implement is connected. In this operable configuration, the rotating tines on the respective rake baskets engage the crop across the entire transverse width of the operating implement to manipulate the crop in the desired manner. To transport the tedder or rotary rake from one location to another, the implement can be placed into a transport configuration in which the individual rake baskets are displaced into a position that above and centrally positioned over a central transport frame.

For example, the rotary rake implement in U.S. Pat. No. 4,366,666, granted to Cornelis van der Lely on Jan. 4, 1983, a four rotor rotary rake has two rake baskets on opposing side of an implement centerline for operational configuration; however, the two outer rake baskets are pivotable into a vertical orientation to move into a transport configuration that has a narrower transport width than when the implement is in the operative configuration. As a contrast, the rotary rake, disclosed in U.S. Pat. No. 4,166,352, granted to Gregor Knusting on Sep. 4, 1979, has four rotors also, but are pivoted in a horizontal manner to trail behind one another. Other tedders and rotary rakes are manufactured with six or more individual rotors that convert into a transport position by vertically pivoting the outer rotors relative to the adjacent rotors and then vertically pivoting those adjacent rotors relative to the inner rotors, which provides a transport configuration that has two vertically oriented folded rotors and two horizontally oriented folded rotors, placing a substantial amount of weight on the inboard transport wheels.

Suspension of pull-type rotary rakes and tedders is not provided because a suspended frame can result in the individual rotor units bouncing relative to the ground while the implement is being operated. If these individual rotor units are bouncing, the tines will not track along the surface of the ground properly to engage the cut crop in order to manipulate the crop into either windrows or into a fluffed condition for subsequent raking into windrows. Therefore, although tedders and rotary rakes have been commercially available for decades, these implements remain unsuspended between the frame and the wheels supporting the frame for movement over the ground. The only suspension concept that has been incorporated into tedders and rotary rakes is to utilize a large balloon tire that flexes somewhat when an impact is encountered.

In U.S. Pat. No. 4,043,571, granted to Francois Guerbet on Aug. 23, 1977, an axle suspension system is disclosed in which the vehicle chassis has a hollow cross frame member that contains a rectangular bar that is surrounded by four rubber blocks with the bar oriented at about 45 degrees to the cross frame member so that one of rubber blocks can be located at the corner of the cross frame member to engage a flat surface of the bar, thus maintaining the bar within the cross frame member. The movement of the bar, which is connected to the wheel of the vehicle, compresses the rubber blocks to provide suspension between the wheel and the frame of the vehicle.

It would be desirable to provide suspension for a pull-type rotary rake and/or tedder, particularly for the transportation of the implement over the highway while in a folded transport configuration, without negatively impacting the operational efficiencies of the rake baskets in engaging the rotating tines with the cut crop lying on the field.

SUMMARY OF THE INVENTION

It is an object of this invention to overcome the disadvantages of the prior art by providing a suspension mechanism for a rotary rake and tedder that changes the suspension between the transport wheels and the frame between the operating and transport configurations of the rotary rake and tedder.

It is another object of this invention to provide a suspension mechanism for a crop engaging implement that has a folded transport configuration and an extended operating configuration that provides minimal suspension when the implement is in the operating configuration and maximum suspension when in the transport configuration.

It is a feature of this invention that the suspension mechanism includes shock absorbing members mounted within the interior of a tubular member that provide a torsional spring force with the movement of the wheel assemblies.

It is an advantage of this invention that the shock absorbing members are elastomeric.

It is another advantage of this invention that the elastomeric shock absorbing members are preferably formed of 90 durometer urethane.

It is another feature of this invention that the suspension mechanism includes a square rod formed as part of the wheel assembly being received within the interior of the tubular member having the shock absorbing members mounted at the corners of the tubular member between the corners of the square rod of the wheel assembly.

It is still another feature of this invention that the deflection of the transport wheel assembly causes a corresponding rotation of the square rod to compress the elastomeric members and provide a torsional spring force that provides suspension to the implement.

It is yet another feature of this invention that the re-configuration of the implement into the folded transport position places additional weight on the transport wheels and causes a deflection of the wheel assembly that compresses the elastomeric members.

It is still another advantage of this invention that the compression of the elastomeric shock absorbing members when the implement is placed into the folded transport configuration maximizes the amount of suspension available to the implement due to the spring force asserted by the compressed elastomeric shock absorbing members.

It is yet another advantage of this invention that the lack of compression of the elastomeric shock absorbing member when the implement is placed into the extended operating configuration minimizes the amount of suspension asserted on the implement due to the lack of spring force being asserted on the frame by the deflection of the wheel members.

It is yet another advantage of this invention that the extensive compression of the elastomeric shock absorbing members is encountered only when the implement is placed into the folded transport position with the weight of the implement being carried by the transport wheel assemblies.

It is yet another feature of this invention that the suspension mechanism incorporates an end cap formed with a tab engagable with a stop member mounted on the tubular member so that the movement of the square rod within the tubular member is limited in one direction.

It is still another feature of this invention that the end cap can be used to pre-load the suspension mechanism so that the torque required to rotate the torsion axle is not a linear relationship between torque and rotational movement.

It is still another advantage of this invention that the end cap inhibits rotational movement until a pre-determined torque is induced into the torsion bar.

It is a further advantage of this invention that the deflection of the wheel assemblies caused by the wheel assemblies encountering an obstacle when the implement is in the extended operating configuration causes a limited compression of the elastomeric shock absorbing members to provide a minimal amount of suspension to the implement when in the extended operating configuration.

It is still another object of this invention to provide a suspension mechanism in the mounting of a support wheel corresponding to each of the rake baskets on a rake/tedder implement.

It is yet another object of this invention to provide a suspension mechanism for an implement moveable between a folded transport configuration where maximum suspension is provided and an extended operating configuration where minimum suspension is provided that is durable in construction, inexpensive of manufacture, carefree of maintenance, facile in assemblage, and simple and effective in use.

These and other objects, features and advantages are accomplished according to the instant invention by providing a suspension mechanism for a rotary rake implement that positions elastomeric shock absorbing members in the corners of a tubular member situated in between the corners of a square rod formed as part of the wheel assembly received within the tubular member such that the corners of the square rod are rotated about 45 degrees to the tubular member when the implement is in an extended operating configuration. The movement of the implement into a folded transport configuration with the weight of the implement supported on the transport wheel assemblies causes a deflection of the square rod that compresses the elastomeric shock absorbing members within the corners of the tubular member to provide maximum suspension for the implement when in transport, while providing minimum suspension when the implement is in operation. An end cap on the square rod engages a stop formed on the tubular member to control rotation.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 3 is an exploded view of the transport wheel axle assembly with the tire removed for purposes of clarity;

FIG. 4 is a front perspective view of the wheel axle assembly under conditions where the implement is in an operative configuration;

FIG. 5 is a rear perspective view of the transport wheel axle assembly with the end plate and tire removed for purposes of clarity corresponding to the implement being in the operative configuration;

FIG. 6 is a side elevational view of the transport wheel assembly with the tire removed for purposes of clarity under conditions where the implement is in an operative configuration;

FIG. 7 is a side elevational view of the transport wheel assembly similar to that of FIG. 6, but corresponding to the implement being in a transport configuration and undergoing a maximum recommended deflection while in the transport configuration;

FIG. 8 is a side elevational view of the transport wheel assembly with the tire removed for purposes of clarity under conditions where the implement is in the operative configuration with a torque pre-load applied to the suspension and retained by the engagement between the tab on the end plate and the stop suffixed to the tubular member;

FIG. 9 is a side elevational view of the transport wheel assembly similar to that of FIG. 7, but with the end plate removed to depict the full engagement of the square rod with the elastomeric members;

DETAILED DESCRIPTION OF THE PREFERRED EMBODIMENT

Figure 1:
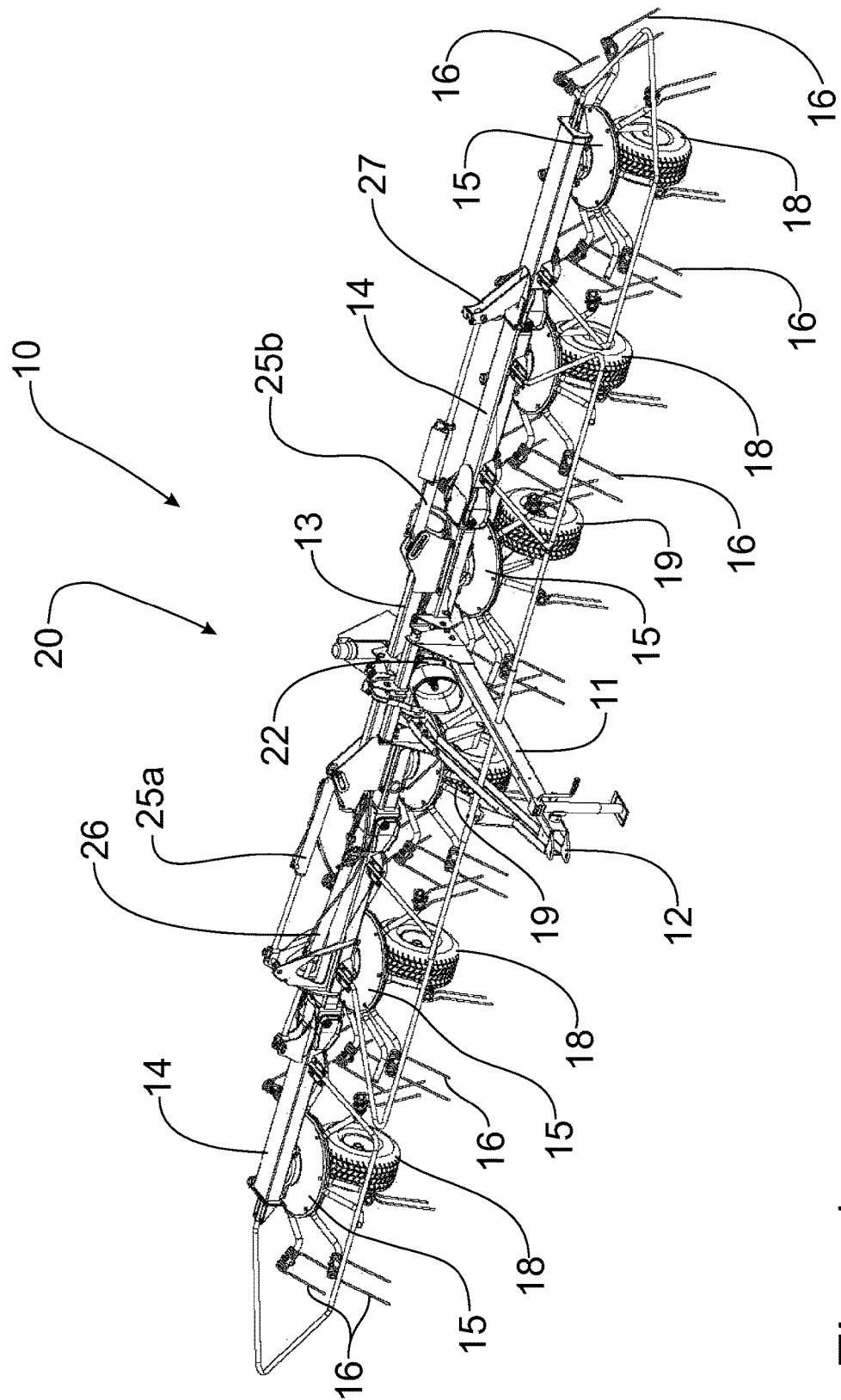
FIG. 1 is a front perspective view of an agricultural implement known as a tedder incorporating the principals of the instant invention, the tedder has six rake baskets in a transverse array across the direction of travel of the implement when connected to a prime mover, such as a tractor, the tedder being depicted in the operational configuration.
Figure 2:
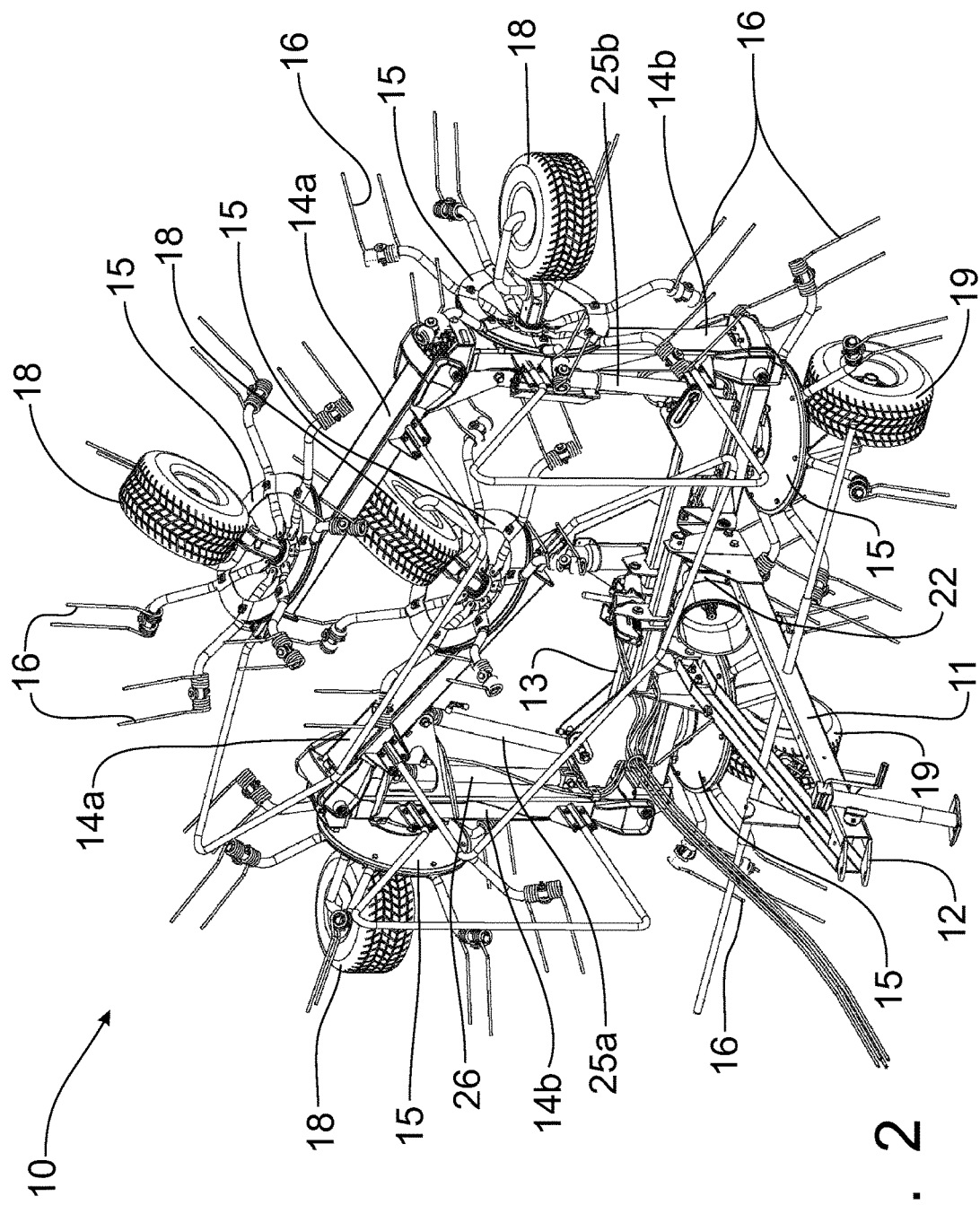
FIG. 2 is a front perspective view of the agricultural implement of FIG. 1 but folded into a transport configuration with the rake baskets being folded over the transport wheels mounted to the frame of the tedder.

Referring to FIGS. 1 and 2, an agricultural implement incorporating the principals of the instant invention can best be seen. References to left, right, forward and reverse are utilized as a matter of convenience and are determined by standing at the rear of the implement 10 and facing the hitch 12, which is connectable to a prime mover, thus facing the normal direction of travel of the implement 10. The agricultural implement 10 is depicted as a tedder having multiple rake baskets 15 rotatably supported from a folding frame 11. The implement 10 could also be a rotary rake having multiple rake baskets 15, the primary difference between a tedder and a rotary rake being the control of the tines 16 on the individual rake baskets 15 to fluff the cut crop, as would be done by a tedder, or to move the cut crop into a windrow for subsequent baling, as would be done by a rotary rake. The instant invention is applicable to both forms of the agricultural implement 10 as traditionally neither form of the agricultural implement 10 have been provided with suspension of the frame 11 relative to the transport wheels 19.

The implement 10 is positionable in an operative configuration, as depicted in FIG. 1, in which the individual rake baskets 15 are displayed along the ground in an arrangement transverse to the normal direction of travel of the implement 10 when connected to a tractor or other prime mover (not shown). Alternatively, the implement 10 can be placed in a transport configuration, as depicted in FIG. 2, in which the frame 11 has been pivoted vertically to position the two outermost rake baskets 15 on either side of the centerline into a vertical position above the two innermost rake baskets 15 and the transport wheels 19 supporting the frame 11 for movement over the ground. The operative configuration is used when the implement is engaging the cut crop on the field, while the transport configuration is utilized when the implement 10 is to be moved from one location to another without engaging crop material.

The frame 11 of the implement 10 terminates at a forwardmost position in a hitch 12 that is detachably connectable to the tractor (not shown). The frame 11 has a central frame portion 13 that is supported on the wheels 19 and from the central frame portion 13 a pair of wings 14 extend transversely outwardly from the central portion 13 to support the rake baskets 15. Each wing 14 can be pivoted at selected locations in order to fold the corresponding rake baskets 15 vertically into the positions depicted in FIG. 2. As can be seen in FIGS. 1 and 2, the individual rake baskets 15 are provided with support wheels 18 that are mounted from the corresponding wing 14 to support the associated rake basket 15 for movement over the surface of the ground. The support wheels 18 fold upwardly with the pivotal movement of the associated wing 14 and corresponding rake basket 15. The support wheels 18 facilitate the positioning of the rake tines 16 in close proximity to the ground during normal operation of the implement 10.

A drive mechanism 20 is supported on the frame 11 and includes a power input shaft (removed for purposes of clarity) that is connectable to the conventional power take-off shaft of the tractor (not shown) to received rotational power therefrom and distribute the rotational movement to the individual rake baskets 15. The power input shaft interconnects the tractor power take-off shaft (not shown) and the gearbox 22 which has output shafts extending outwardly within the interior of the respective wings 14, to individual gearboxes (not shown) associated with the individual rake baskets 15 to drive the rotation of the rotors 15.

Each wing 14 is formed of subsections, 14a, 14b, the number of which corresponds to the number of rake baskets 15 located outboard of the innermost two rake baskets 15 supported on the central frame portion 13. Each wing subsection is pivoted to the inboard wing subsection or to the central frame portion 13. In the six rake basket 15 configuration depicted in FIGS. 1 and 2, each wing 14 has an outboard wing subsection 14a pivotally connected to an intermediate wing subsection 14b, which in turn is pivotally connected to the adjacent side of the central frame portion 13. Pivotal movement of the wing subsections is accomplished by actuators, such as hydraulic cylinders 25, 26.

One skilled in the art will notice that the outermost rake baskets 15 are vertically spaced in the transport configuration shown in FIG. 2. To accomplish this transport configuration, the right side wing 14 has an outboard hydraulic cylinder 26 interconnecting the outboard wing section 14a and the adjacent intermediate wing section 14b, and an inboard hydraulic cylinder 25a that interconnects the central frame section 13 and the right intermediate wing subsection 14b. Folding the right wing 14 is accomplished by first contracting the outboard hydraulic cylinder 26 to pivot the outboard wing subsection 14a to an orientation a little inboard of vertical. Then, the right inboard hydraulic cylinder 25a is contracted to pivot the right intermediate wing subsection 14b to a generally vertical orientation, and moving the right outermost rake basket 15 over top of the central frame section 13.

The left wing 14 is then pivoted by a left inboard hydraulic cylinder 25b that interconnects the central frame portion 13 and the left outboard wing subsection 14a by connection of the terminus of the hydraulic cylinder 25b to a mounting bracket 27 carried on the left outboard wing subsection 14a. The wing 14 can be pivoted by contracting the left inboard hydraulic cylinder 25b until the left outboard wing subsection 14a is slightly outboard of a vertical orientation. At this point, the mounting bracket 27 engages the top surface of the left intermediate wing subsection 14b to serve as a stop for the pivotal movement of the left outboard wing subsection 14a. Further contraction of the left inboard hydraulic cylinder 25b will then cause pivotal movement of the left intermediate wing subsection 14b relative to the central frame portion 13 to the position shown in FIG. 2 because the left outboard wing subsection 14a cannot pivot any further relative to the adjacent intermediate wing subsection 14b.

One skilled in the art will recognize that each wing subsection 14a, 14b is provided with a separate support wheel 18 that is pivoted along with the corresponding rake basket 15 such that the outboard rake baskets 15 are inverted with the support wheel 18 being above the corresponding outboard rake basket 15 and the support wheel 18 for the intermediate wing subsections 14b are positioned outboard of the corresponding intermediate rake basket 15. In this transport configuration depicted in FIG. 2, all of the weight of the entire implement 10, including the wings 14, central frame portion 13, rake baskets 15 and support wheels 18 are carried on the transport wheels 19. Conversely, when the implement 10 is in an operating configuration as depicted in FIG. 1, the weight of the implement 10 is fairly evenly distributed over the support and transport wheels 18, 19, at least the transport wheels 19 have substantially less weight supported thereby than when the implement 10 is in the transport configuration.

A suspension mechanism 30 is provided for the transport wheels 19, as can best be seen in FIGS. 3-9. The transport wheel assembly 19, as seen best in the exploded view of FIG. 3, includes a spindle 31 on which a tire (removed for purposes of clarity) is mounted in a conventional manner. The spindle 31 extends generally horizontally from the bottom portion of a vertical wheel arm 32, while a square rod 33 projects from an upper portion parallel to the spindle 31 to complete the wheel assembly 19. The square rod 33 is received within the interior of a tubular member 13a that is affixed to the central frame portion 13 by a gusset 34. Shock absorbing members 35 are inserted into the tubular member 13a at the corners thereof to engage the flat sides of the square rod 33 which is oriented at a 45 degree angle with respect to the tubular member 13a, as may be best seen in FIG. 3.

An end cap 36 is mounted on the distal end of the square rod 13a to retain the shock absorbing members 35 within the interior of the tubular member 13a. A pair of retainer pins 38 is engaged into the distal end of the square rod 33 to retain the end cap 36 against the tubular member 13a. The end cap 36 is formed with a tab 37 that engages a stop member 39 welded underneath the tubular member 13a. The tab 37 is engaged with the stop member 39 when the implement 10 is in an operating position and a minimum amount of weight of the implement 10 is supported by the transport wheels 19. As will be described in greater detail below, when additional weight is encountered by the transport wheels 19, or when the transport wheels 19 hit an obstacle or depression on the surface of the ground, the wheel mounting arm 32 deflects and the tab 38 separates from the stop member 39, as is reflected in FIGS. 7 and 9.

The shock absorbing members 35 are preferably elastomeric members sized to fit between the corner of the tubular member 13a and the flat side of the square rod 33. The elastomeric members 35 is preferably 90 durometer urethane, but other configurations of the shock absorbing members 35 could include a torsion spring in the form of a spring anchored between the square rod and the tubular member 13a, or in the form of a torsion member anchored between the frame 11 and the wheel mounting member 32 that provides a spring force with the torsional twisting of the torsion member. One skilled in the art will also recognize that a compression spring could also be utilized, particularly is combined with a linkage that enhances the application of the exerted spring force with the increase in weight applied to the transport wheels when the implement 10 is moved into the transport configuration.

The preferred embodiment of the shock absorbing members 35 being elastomeric members works through the compression of the elastomeric members when the square rod 33 rotates within the tubular member 13a in conjunction with the deflection of the transport wheel assembly 19 upon the imposition of forces thereon. These imposed forces can be the result of the transport wheel 19 encountering an obstacle or a depression in the ground forcing the wheel mounting arm 32 to rotate relative to the frame. Also, these imposed forces can be the additional weight carried by the transport wheels 19 when the wings 14 are folded to place the implement 10 into the transport configuration, as depicted in FIG. 2.

Looking at FIGS. 6-9, the transport wheel 19 and the suspension mechanism 30 can best be seen. In FIG. 9, the end cap 36 has been removed to view the elastomeric shock absorbing members 35, although the retaining pins 38 are still shown. In FIG. 8, the transport wheel 19 is depicted as the implement 10 is in the normal operative configuration, as shown in FIG. 1, with a torsional pre-load applied to the suspension mechanism due to the slight engagement between the corners of the square rod 33 and the elastomeric shock absorbing members 35 as retained by the engagement of the tab 37 of the end cap 36 against the stop 39 affixed to the tubular member 13a. The elastomeric shock absorbing members 35 are stowed in the corners of the tubular member 13a, as best seen in FIG. 8, resting primarily against the sides of the square rod 33 and being partially engaged by the corners of the square rod 33. In this orientation, the elastomeric shock absorbing members 35 assert a minimum of suspension on the frame 11, allowing the implement 10 to operate as a conventional tedder with the tines 16 sweeping consistently along the surface of the ground to engage the cut crop disposed thereon.

With the transport wheel 19 hitting an obstacle or falling into a depression on the ground, the wheel mounting arm 32 will rotate slightly toward the position shown in FIG. 9, but corners of the square rod 33 only slightly pressing into the corresponding elastomeric shock absorbing members 35, which produces a small amount of shock absorbing or dampening between the square rod 33 and the tubular member 13a. This dampening reduces the amount of acceleration that the frame 11 would encounter when the transport wheel 19 hits a hole or a bump in the field. By reducing the amount of acceleration encountered by the frame 11, the frame 11 and the connection points thereof would be subject to less mechanical stress. Furthermore, the dampening characteristics of the elastomeric shock absorbing members 35 would reduce the amount of fatigue stress that the implement 10 would need to handle.

The additional weight applied to the transport wheels 19, when the implement 10 moves into the transport configuration, is depicted in FIGS. 7 and 9. As best seen in FIG. 9, the rotation of the wheel mounting arm 32 results in the corners of the square rod 33 driving deeply into the corresponding elastomeric shock absorbing members 35 which are restrained from moving by the tubular member 13a. The compression of the elastomeric shock absorbing members 35 provides substantial suspension for the frame 11 when in the transport configuration, allowing the implement 10 to transport with a suspended frame 11, reducing stress on the frame 11 from the bouncing of the implement 10 being transported.

With reference to FIGS. 6 and 7, the tab 37 engages the stop member 39 when the implement 10 is in the normal operating configuration to pre-load the torsion spring in the form of the engagement of the corners of the square rod 33 into the elastomeric members 35 to keep the tedder suspension mechanism 30 from deflecting until a certain predetermined load is able to lift the tab 37 away from the stop 39, as depicted in FIG. 7, thus keeping the transport wheel assembly 19 in a rigid relationship with the frame 11 until the transport wheel 19 deflects as described above. When the wheel mounting arm 32 deflects from the orientation in the operating configuration, reflected in FIG. 6, to the orientation in the transport configuration, reflected in FIG. 7, the tab 37 separates from the stop member 39, rotating with the square rod 33 on which the end cap 36 is mounted.

Figure 10:
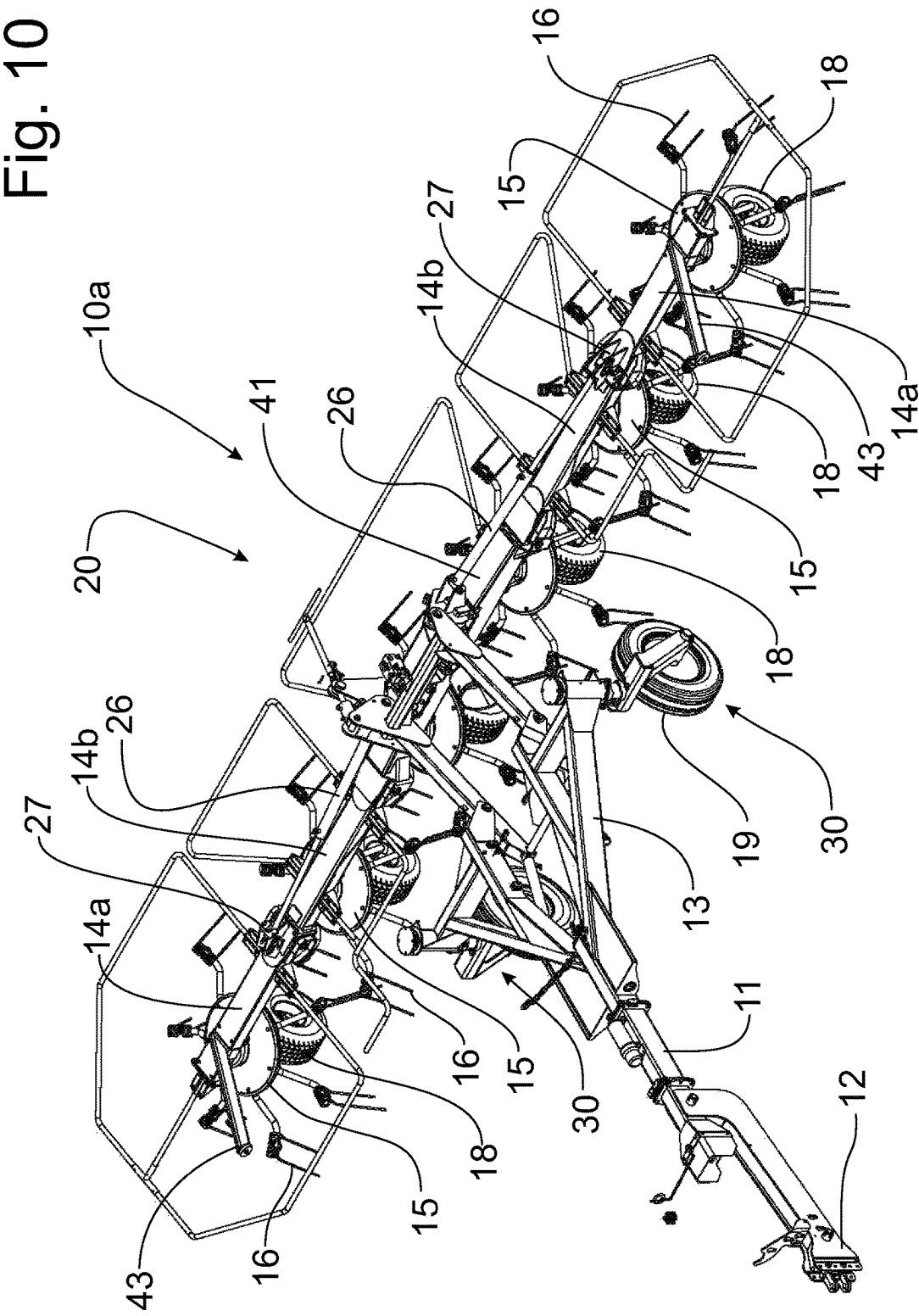
FIG. 10 is a front perspective view of a second embodiment of an implement incorporating the principles of the instant invention, the implement being shown in a laterally extending operating configuration.
Figure 11:
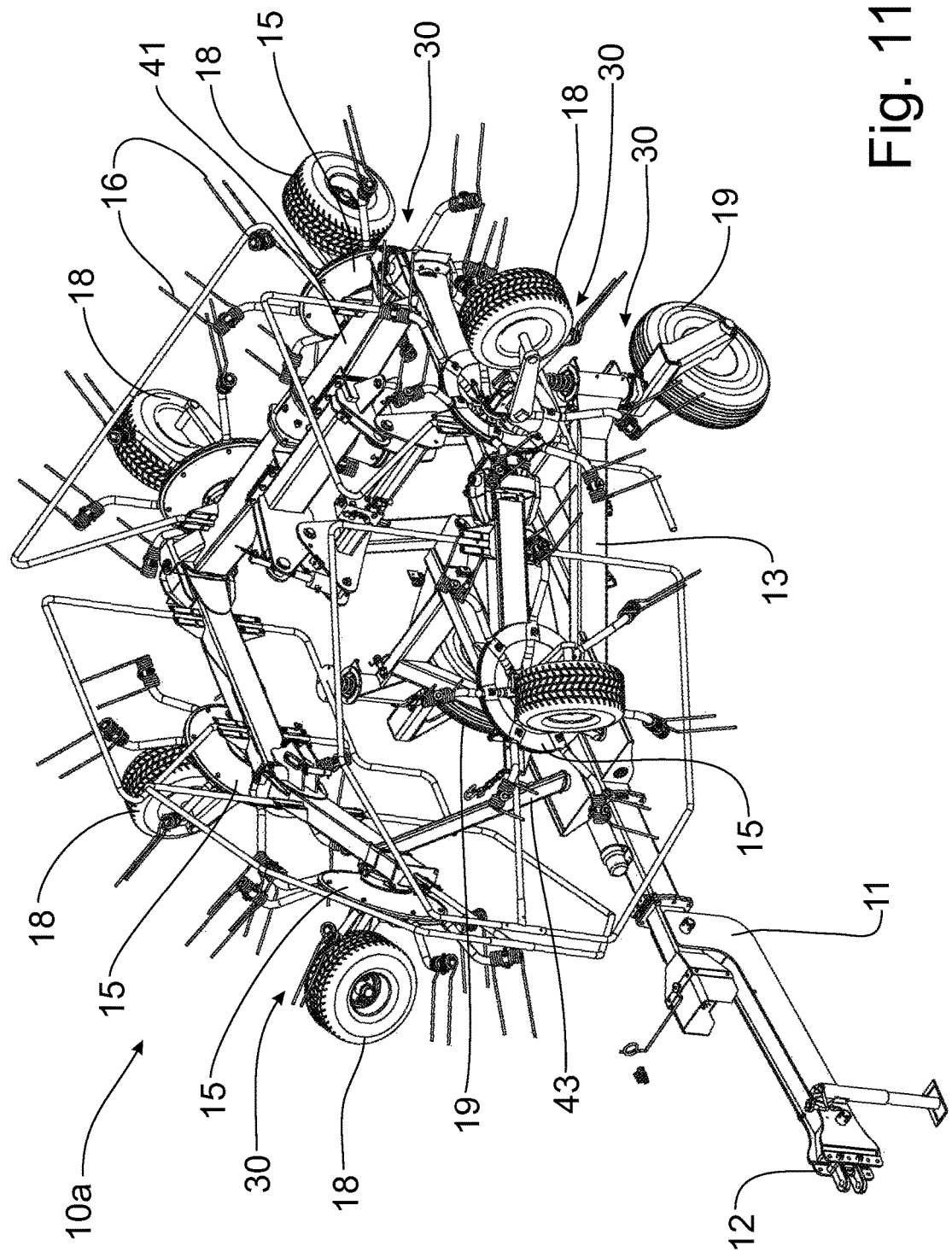
FIG. 11 is a front perspective view of the implement shown in FIG. 10 but with the implement folded into a transport configuration.

A different implement 10a configuration can be seen in FIGS. 10 and 11. Instead of the central rake baskets 15 being carried directly on the central frame portion 13, the two central rake baskets are carried on a trailing frame member 41 that is pivotally connected to and positioned rearwardly of the central frame portion 13. The left and right wings 14 are lateral extensions of the central trailing frame member 41 when in the operating configuration as shown in FIG. 10. Each wing 14 carries a pivot to move the outboard wing portions 14a relative to the intermediate wing portions 14b. The hydraulic cylinders 25a, 25b are mounted on the central trailing frame member 41 and extend to the respective outboard wing portions 14a. When in the operating position, as depicted in FIG. 10, most of the weight of the implement 10a is carried on the respective support wheels 18 and the transport wheels 19 carry mostly the weight of the frame 11.

When the implement 10a is to be transported from one location to another, the rake baskets 15 can be placed into a transport position, as is depicted in FIG. 11. Rather than vertically folding the wings 14, as is accomplished in the configuration of the implement 10 shown in FIGS. 1 and 2, the wings 14 of this alternative configuration of the implement 10a are folded horizontally. A hydraulic cylinder (not shown) pivots the central trailing frame 41, along with the respective wings 14, vertically off the ground, and then the outboard hydraulic cylinders 26 can pivot the outboard wing sections 14a forwardly until the cylinder mounts 27 bottom out against the intermediate wing sections 14b, which causes the hydraulic cylinders 26 to fold the intermediate wing sections 14b forwardly, relative to the raised trailing frame member 41. The end result is shown in FIG. 11 where the wing stop members 43, carried by the outboard ends of the outboard wing sections 14a, are rested against the frame 11.

As with the embodiment of the implement 10 described above, the suspension mechanism 30 can be utilized with the transport wheels 19 to provide a maximum spring force when the implement 10a is placed into the transport orientation shown in FIG. 11 with most of the weight of the implement 10a being carried on the transport wheels 19. Similarly, when the implement 10a is in the operating position as shown in FIG. 10, less weight is carried by the transport wheels 19, and the suspension mechanism 30 asserts less spring force.

One skilled in the art will recognize upon a reading of this description that the above-described suspension mechanism 30 could also be utilized with each of the support wheels 18 beneath the respective rake baskets 15. In this manner, each of the rake baskets 15 would have an operative suspension mechanism 30 that is capable of asserting a spring force between the wheel 18 and the rake basket 15 to soften the movement of each respective rake basket 15 if the corresponding wheel 18 drops into a hole in the field. Preferably, such a suspension mechanism 30 would utilize elastomeric members in the manner shown and described above, or in the alternative could utilize torsion or compression springs as well. Accordingly, the amount of spring force exerted between the wheel 18 and the corresponding rake basket 15 would depend on the amount of deflection the wheel 18 encounters to force the internal square rod into the elastomeric members in the corners of the corresponding support beam.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. The invention is not otherwise limited, except for the recitation of the claims set forth below.

Having thus described the invention, what is claimed is:

1. An implement for engaging and laterally moving crop material on the ground utilizing a plurality of rotary crop engaging members having tines mounted thereon to engage said crop material on the ground, comprising:
   a frame including a central frame portion with wings connected to said central frame portion and being selectively movable between an outwardly extending operating configuration and a folded transport configuration;
   said plurality of rotary crop engaging members being supported on said frame, at least a portion of said crop engaging members being supported on said wings and positionable vertically relative to said central frame portion when said wings are in said transport configuration;
   a pair of transport wheel assemblies supported from said central frame portion to support said crop engaging members above the ground when in said transport configuration; and
   a suspension mechanism interconnecting each of said transport wheel assemblies and said frame to provide minimal suspension between said transport wheels and said frame corresponding to a pre-load spring force when said wings are in said operating configuration and maximum suspension between said transport wheels and said frame when said wings are in said transport configuration, said suspension mechanism including:
      a rectangular tubular member affixed to said frame;
      a square rod affixed to the corresponding said transport wheel assembly;
      a shock absorbing apparatus disposed between said tubular member and said rod to provide suspension between the corresponding transport wheel assembly and said frame; and
      said square rod having an end cap mounted on an end thereof that extends outboard of said tubular member, said end cap including a tab engagable with a stop member carried on said tubular member to limit deflection of said square rod relative to said tubular member when said implement is in said operating configuration, the engagement between said tab on said end cap and said stop member carried by said tubular member applying said pre-load of spring force between the wheel assemblies and the frame such that said pre-load spring force is no lower than said minimal suspension and limits the deflection of said square rod to allow said implement to move consistently along the surface of the ground when in said operating configuration.

2. The implement of claim 1 wherein said shock absorbing apparatus being an elastomeric member positioned at each corner of said tubular member and engaging a flat side of said square rod, said square rod being oriented at approximately 45 degrees with respect to said tubular member when said implement is in a no-load configuration.

3. The implement of claim 2 wherein the deflection of said transport wheel assemblies when said implement is in said folded transport configuration due to the weight of the implement being carried on the transport wheel assemblies compresses said shock absorbing members to provide a spring force between said square rod and said tubular member.

4. The implement of claim 3 wherein the deflection of said transport wheel assemblies when said implement is in said folded transport configuration rotates said square rod relative to said tubular member so that that the corners of the square rod move into engagement with the elastomeric shock absorbing members to compress the elastomeric shock absorbing members within the corners of the tubular member.

5. An implement for engaging and laterally moving crop material on the ground, comprising:
   a frame including a central frame portion with wings connected to said central frame portion and being selectively movable between an outwardly extending operating configuration and a folded transport configuration;
   a plurality of rotatable rake assemblies supported on said frame, at least a portion of said rake assemblies being supported on said wings and positionable vertically relative to said central frame portion when said wings are in said transport configuration, at least one of said rake assemblies having a support wheel for supporting a corresponding said rake assembly above the ground, said at least one support wheel being rotatable about an axis of rotation oriented in a fixed position parallel to said frame;
   a pair of transport wheel assemblies supported from said central frame portion to support said crop engaging members above the ground when in said transport configuration, each said transport wheel assembly including a transport wheel rotatable about an axis of rotation oriented in a fixed position parallel to said frame; and
   a suspension mechanism interconnecting said at least one support wheel and the corresponding rake assembly and interconnecting each said transport wheel and said frame to provide maximum suspension for each said transport wheel when said wings are in said transport configuration and minimum suspension for said at least one support wheel and each said transport wheel when said wings are in said operating configuration, said suspension mechanism including:
   a rectangular tubular member affixed to said frame;
   a square rod affixed to the corresponding said transport wheel assembly;
   a shock absorbing apparatus disposed between said tubular member and said rod to provide suspension between the corresponding transport wheel assembly and said frame; and
   said square rod having an end cap mounted on an end thereof that extends outboard of said tubular member, said end cap including a tab engagable with a stop member carried on said tubular member to limit deflection of said square rod relative to said tubular member when said implement is in said operating configuration, the engagement between said tab on said end cap and said stop member carried by said tubular member applying a pre-load of spring force between the wheel assemblies and the frame and limits the deflection of said square rod until a force greater than said pre-load spring force is induced into said wheel assemblies so that said implement can move consistently across the surface of the ground when in the operating position.

6. The implement of claim 5 wherein the deflection of said transport wheel assemblies when said implement is in said folded transport configuration due to the weight of the implement being carried on the transport wheel assemblies rotates said square rod relative to said tubular member to cause compression of said elastomeric shock absorbing members through engagement thereof by the corners of said square rod to provide a spring force between said square rod and said tubular member.

* * * * *